United States Patent
Suenaga

(10) Patent No.: US 10,162,573 B2
(45) Date of Patent: Dec. 25, 2018

(54) STORAGE MANAGEMENT SYSTEM, STORAGE MANAGEMENT METHOD, STORAGE MEDIUM AND INFORMATION PROCESSING SYSTEM

(71) Applicant: NEC Corporation, Tokyo (JP)

(72) Inventor: Masaya Suenaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/495,021

(22) Filed: Sep. 24, 2014

(65) Prior Publication Data
US 2015/0089115 A1    Mar. 26, 2015

(30) Foreign Application Priority Data
Sep. 24, 2013   (JP) .................................. 2013-197423

(51) Int. Cl.
G06F 3/06    (2006.01)

(52) U.S. Cl.
CPC .......... *G06F 3/0689* (2013.01); *G06F 3/0607* (2013.01); *G06F 3/0631* (2013.01); *G06F 3/0659* (2013.01)

(58) Field of Classification Search
CPC .... G06F 3/0689; G06F 3/0659; G06F 3/0631; G06F 3/0607
See application file for complete search history.

(56) References Cited

U.S. PATENT DOCUMENTS

| | | | |
|---|---|---|---|
| 6,324,604 B1 | 11/2001 | Don et al. | |
| 6,557,075 B1 * | 4/2003 | Maher | G06F 12/0866 |
| | | | 711/113 |
| 6,950,900 B1 * | 9/2005 | McKean | G06F 3/0617 |
| | | | 711/114 |

(Continued)

FOREIGN PATENT DOCUMENTS

| | | |
|---|---|---|
| JP | 01-255918 | 10/1989 |
| JP | 07-129325 | 5/1995 |

(Continued)

OTHER PUBLICATIONS

JP Office Action, dated Aug. 18, 2015; Application No. 2013-197423.

*Primary Examiner* — David Yi
*Assistant Examiner* — Zubair Ahmed
(74) *Attorney, Agent, or Firm* — Young & Thompson

(57) ABSTRACT

The present invention provides a storage management system that suppresses performance degradation due to Read-Modify-Write. The storage management system includes: a management unit managing a storage system including a first storage medium having a first physical sector size and an alternative storage medium having a second physical sector size smaller than the first physical sector size; an acceptance unit accepting a write request; and a disk processing control unit, when a write area identified by the write request is an area on the first storage medium and the start address or end address of the write area does not correspond to a boundary of a physical sector of the first storage (Continued)

medium, writing data identified by the write request on the alternative storage medium, notifying the host of completion of the write, and then transferring the data from the alternative storage medium to the first storage medium.

16 Claims, 12 Drawing Sheets

(56) References Cited

U.S. PATENT DOCUMENTS

| | | | |
|---|---|---|---|
| 8,291,190 B2 | 10/2012 | Watanabe et al. | |
| 8,468,312 B2 | 6/2013 | Benhase et al. | |
| 8,521,976 B1* | 8/2013 | Wu | G06F 3/061 |
| | | | 711/163 |
| 8,812,798 B2 | 8/2014 | Benhase et al. | |
| 2004/0255026 A1* | 12/2004 | Blount | G06F 3/0613 |
| | | | 709/226 |
| 2008/0126855 A1* | 5/2008 | Higashijima | G06F 11/0727 |
| | | | 714/16 |
| 2009/0168230 A1* | 7/2009 | Hwang | G11B 5/59655 |
| | | | 360/77.08 |
| 2011/0072232 A1 | 3/2011 | Watanabe et al. | |
| 2013/0219119 A1* | 8/2013 | Galbraith | G06F 11/1076 |
| | | | 711/114 |
| 2013/0262763 A1 | 10/2013 | Benhase et al. | |
| 2014/0368945 A1* | 12/2014 | Blount | G06F 3/0674 |
| | | | 360/48 |

FOREIGN PATENT DOCUMENTS

| | | |
|---|---|---|
| JP | 2002-520691 | 7/2002 |
| JP | 2010-049764 | 3/2010 |
| JP | 2014-523043 | 9/2014 |

\* cited by examiner

STORAGE MANAGEMENT SYSTEM, STORAGE MANAGEMENT METHOD, STORAGE MEDIUM AND INFORMATION PROCESSING SYSTEM

This application is based upon and claims the benefit of priority from Japanese Patent Application No. 2013-197423, filed on Sep. 24, 2013, the disclosure of which is incorporated herein in its entirety by reference.

TECHNICAL FIELD

The present invention relates to a technique of managing a storage medium in a case where the physical sector size of the storage medium and the logical sector size managed by a host are different from each other.

BACKGROUND ART

Storage media such as hard disk drives (hereinafter abbreviated as "HDDs") store data in units called sectors. When the size of data to be written on a storage medium is smaller than the sector size, the data is stored in one sector. Even when there is an empty area in the sector, other information is not stored in the empty area. When the size of data to be written on the storage medium is greater than the sector size, the data is stored across a plurality of sectors.

Different types of storage media have different sector sizes. The sector size of most HDDs has been 512 bytes (hereinafter abbreviated as "512 B") for many years. HDDs with a sector size of 4 kilobytes (hereinafter abbreviated as 4 KB) have come into widespread use in recent years. 4 KB is 4096 B, which is eight times the 512 B.

Hereinafter, a storage medium having a sector size of 512 B is referred to as a "512-B-sector storage medium". A recording medium having a sector size of 4 KB is referred to as a "4-KB-sector storage medium". A "512-B-sector storage medium" is rephrased by a "storage medium based on 512 B sectors". A "4-KB-sector storage medium" is rephrased by a "storage medium based on 4 KB sectors". Examples of storage media include HDDs, SSDs (Solid State Drives), flash memories, and floppy disks ("floppy" is a registered trademark).

Note that a storage medium with a sector size slightly greater than 512 B (for example, 520 B or 528 B) will also be referred to as a "512-B-sector storage medium" hereinafter for convenience of explanation. Such a storage medium generally includes reserved extra area storing sector check codes and other information in addition to 512 B area. The check code is ECC (Error Checking and Correction), for example. Similarly, a storage medium with a sector size slightly greater than 4096 B (for example, 4104 B, 4160 B, or 4224 B) will also be referred to as a "4-KB-sector storage medium" hereinafter for convenience of explanation. The size of 4160 B is eight times the 520 B.

One of the reasons why 4-KB-sector storage media has come into widespread use will be described. The ratio of the number of bytes required for ECC to the storage capacity of a 4-KB-sector storage medium is smaller compared to that of a 512-B-sector storage medium. Accordingly, the storage capacity is more efficiently used on a 4-KB-sector storage medium than on a 512-B-sector storage medium. This is one of the reasons why 4-KB-sector storage media are widely used.

As for hosts, which are information processing devices that access storage media, more and more OSs (Operating Systems), which cause the hosts to operate, are starting to support 4-KB-sector storage media. However, there are still many hosts that run old OSs that do not support 4-KB-sector storage media.

A host that supports 4 KB sectors will be hereinafter referred to as a "4-KB-sector host". A host that does not support 4 KB sectors (i.e., a host that supports conventional 512 B sectors) will be hereinafter referred to as a "512-B-sector host". A "4-KB-sector host" is rephrased by a "host based on 4 KB sectors". A "512-B-sector host" is rephrased by a "host based on 512 B sectors".

Thus, there may be situations where 512-B-sector storage media, 4-KB-sector storage media, 512-B-sector hosts, and 4-KB-sector hosts are mixedly used.

CITATION LIST

Patent Literature

PTL 1: Japanese Laid-open Patent Publication No. 2010-049764

SUMMARY

An object of the present invention is to provide a storage management system, a storage management method, a storage medium, and an information processing system that are capable of suppressing degradation of performance when a host writes data on a storage medium having a physical sector size different from a logical sector size managed by the host.

A storage management system according to one aspect of the present invention includes
  a management unit managing a storage system including a first storage medium including physical sectors of a first size and an alternative storage medium including physical sectors of a second size smaller than the first size;
  an acceptance unit accepting a write request from a host capable of accessing the storage system, the write request requesting the storage system to make writing in units of the second size; and
    a disk processing control unit
    writing data identified by the write request on the alternative storage medium when a write area identified by the write request is an area on the first storage medium and a start address or an end address in the write area does not correspond to a boundary of a physical sector of the first storage medium,
    notifying the host of completion of the writing, and
    transferring the data from the alternative storage medium to the first storage medium after the notification.

An information processing system according to one aspect of the present invention includes
  a first storage medium including physical sectors of a first size;
  an alternative storage medium including physical sectors of a second size smaller than the first size; and
  a storage management system including
    a management unit managing a storage system including the first storage medium and the alternative storage medium,
    an acceptance unit accepting a write request from a host capable of accessing the storage system, the write request requesting the storage system to make writing in units of the second size, and
    a disk processing control unit
      writing data identified by the write request on the alternative storage medium when a write area identified by the write request is an area on the first storage medium and a start address or an end address in the write area does not correspond to a boundary of a physical sector of the first storage medium, notifying the host of completion of the writing, and transferring the data from the alternative storage medium to the first storage medium after the notification.

A storage management method according to one aspect of the present invention implemented by a computer capable of accessing a storage system including a first storage medium including physical sectors of a first size and an alternative storage medium including physical sectors of a second size smaller than the first size, and a host capable of accessing the storage system, wherein the computer:

accepts a write request from the host, the write request requesting the storage system to make writing in units of the second size; and writes data identified by the write request on the alternative storage medium when a write area identified by the write request is an area on the first storage medium and a start address or an end address in the write area does not correspond to a boundary of a physical sector of the first storage medium;

notifies the host of completion of the writing; and transfers the data from the alternative storage medium to the first storage medium after the notification.

A program according to one aspect of the present invention causing a computer capable of accessing a storage system including a first storage medium including physical sectors of a first size and an alternative storage medium including physical sectors of a second size smaller than the first size, and a host capable of accessing the storage system to perform the steps of:

accepting a write request from the host, the write request requesting the storage system to make writing in units of the second size;

writing data identified by the write request on the alternative storage medium when a write area identified by the write request is an area on the first storage medium and a start address or an end address in the write area does not correspond to a boundary of a physical sector of the first storage medium;

notifying the host of completion of the writing; and transferring the data from the alternative storage medium to the first storage medium after the notification.

The object of the present invention is also achieved by a computer-readable recording medium storing the program described above.

BRIEF DESCRIPTION OF THE DRAWINGS

Exemplary features and advantages of the present invention will become apparent from the following detailed description when taken with the accompanying drawings in which.

EXEMPLARY EMBODIMENTS

In order to facilitate understanding, Read-Modify-Write will be briefly described. It is assumed here that a 512-B-sector host 30 sends a write request to write on a 4-KB-sector storage medium 20.

Sectors are managed using serial numbering called logical block addressing (LBA) or physical block addressing. Logical block addresses are serial numbers of sectors viewed from the host 30. Physical block addresses are serial numbers of sectors viewed from the storage medium 20. Logical block addresses do not necessarily match physical block addresses as will be described later.

Figure 11:
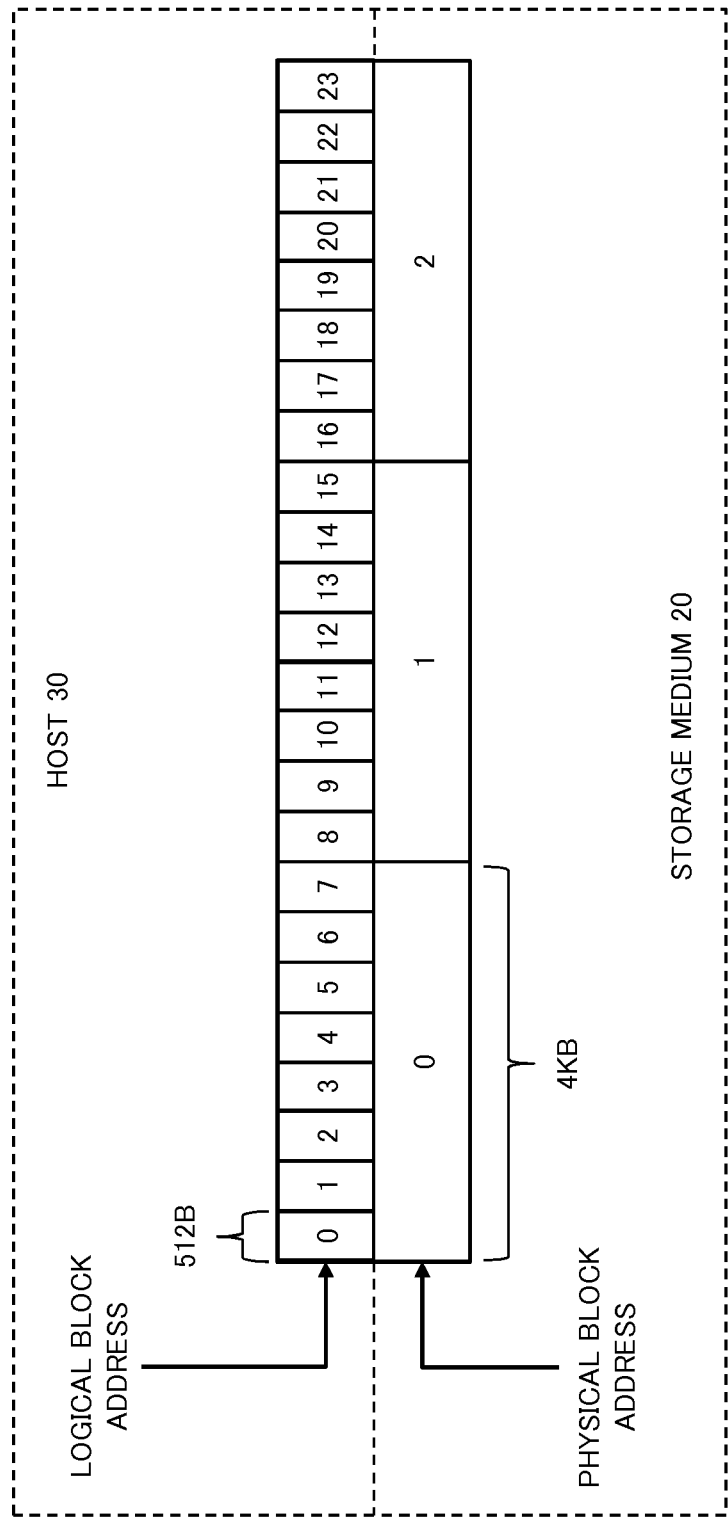
FIG. 11 is a diagram schematically illustrating the correspondence relation between logical block addresses and physical block addresses.

FIG. 11 is a diagram schematically illustrating an example of the correspondence relation between logical block addresses and physical block addresses of the storage medium 20 in a case where the 512-B-sector host 30 manages the 4-KB-sector storage medium 20. The rectangles in the lower half of FIG. 11 represent physical block addresses of the storage medium 20. The rectangles in the upper half of FIG. 11 represent logical block addresses of the storage medium 20 viewed from the host 30. The positional relation between the rectangles in the lower half of FIG. 11 and the rectangles in the upper half of FIG. 11 represents the correspondence relation between the physical block addresses and the logical block addresses.

As illustrated in FIG. 11, the physical sector size of the storage medium 20 is 4 KB. The logical sector size of the storage medium 20 viewed from the host 30 is 512 B. In the example illustrated in FIG. 11, the area with physical block address 1, for example, on the storage medium 20 corresponds to an area with logical block addresses 8 to 15 viewed from the host 30.

The host 30 specifies an area in which data is to be written on storage medium 20 (hereinafter referred to as a "write area") by using logical block addresses. "Specifying a write area" means specifying the start logical block address and the end logical block address for the write area. For example, the host 30 may specify a write area using the logical block address specifying the start for the write area and information indicating the data size of data to be written.

By providing two specific examples, Read-Modify-Write will be described.

Specific Example 1

Specific Example 1 illustrates a case where a host 30 does not need to perform Read-Modify-Write. It is assumed here that a 512-B-sector host 30 sends a write request to write on a 4-KB-sector storage medium 20. The host 30 specifies a write area as "write eight logical sectors of data starting from logical block address 8".

As illustrated in FIG. 11, the start logical block address (i.e., 8) and the end logical block address (i.e., 15) of the logical block addresses in the write area in Specific Example 1 correspond to (in other words, coincide with or match) the boundaries of a physical sector of the storage medium 20. The physical block address corresponding to the area with logical block addresses 8 to 15 is 1. In Specific Example 1, data is written in the area with physical block address 1. The host 30 does not need to perform Ready-Modify-Write in Specific Example 1. Accordingly, the performance of the storage medium 20 does not degrade.

Specific Example 2

Specific Example 2 illustrates a case where a host 30 needs to perform Read-Modify-Write. It is assumed here that a 512-B-sector host 30 sends a write request to write on a 4-KB-sector storage medium 20. The host 30 specifies a write area as "write eight logical sectors of data starting from logical block address 7".

As illustrated in FIG. 11, in Specific Example 2, the start logical block address (i.e., 7) and the end logical block address (i.e., 14) of the logical block addresses in the write area do not correspond to the boundaries of a physical sector of the storage medium 20. The physical block addresses corresponding to the area with logical block addresses 7 to 14 are 0 to 1. In Specific Example 2, the data is written in the area with physical block addresses 0 to 1. In Specific Example 2, the host 30 needs to perform Read-Modify-Write.

Details of the Read-Modify-Write process will be described below. The host 30 first reads data in the area with physical block addresses 0 to 1 on the storage medium 20, i.e., 16 logical blocks of data, onto a memory. The host 30 then writes the data requested to be written into the read data on the memory. Finally, the host 30 overwrites the area with physical block addresses 0 to 1 on the storage medium 20 with the 16 logical blocks of data into which the data has been written. It is known that when the host 30 performs Read-Modify-Write, the performance of the storage medium 20 possibly degrades by half.

As described above, Read-Modify-Write needs to be performed when at least one of the start logical block address and the end logical block address in the write area does not match a boundary of a physical sector of a storage medium.

Exemplary embodiments of the present invention will be described in detail with reference to drawings.

First Exemplary Embodiment

In a first exemplary embodiment, a storage management system 100 capable of suppressing performance degradation when data is written from a 512-B-sector host to a 4-KB-sector storage medium will be described.

Figure 1:
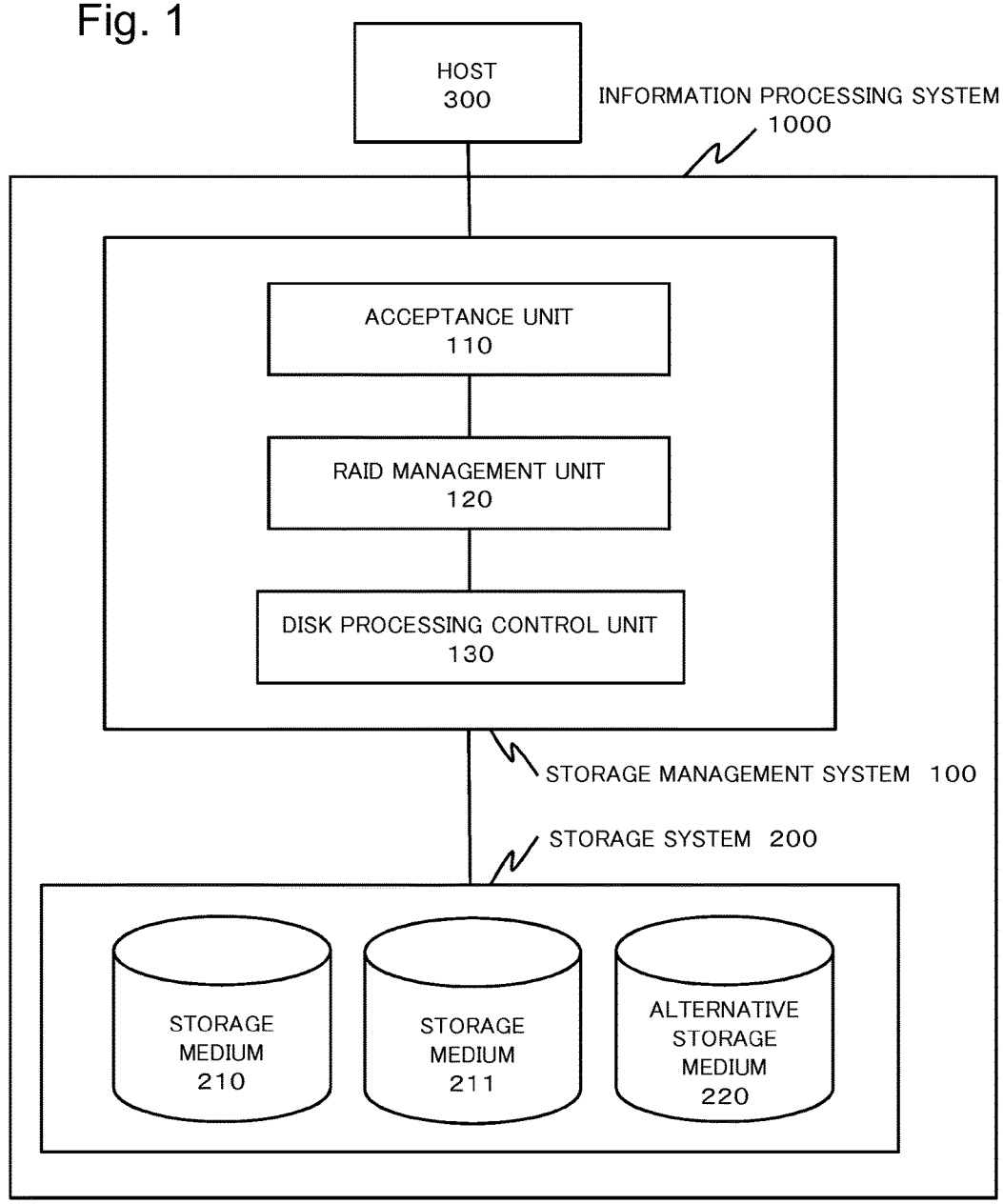
FIG. 1 is a block diagram illustrating the configuration of an information processing system according to a first exemplary embodiment of the present invention.

FIG. 1 is a block diagram illustrating the configuration of an information processing system 1000 according to the first exemplary embodiment. The information processing system 1000 is communicably connected to a host 300. The information processing system 1000 includes a storage management system 100 and a storage system 200.

The host 300 issues requests for processes such as a write process or a read process to the storage system 200. The storage management system 100 accepts the requests from the host 300 to the storage system 200. Based on the accepted request, the storage management system 100 accesses the storage system 200 and performs a process such as a write process or a read process. Upon completion of the requested process, the storage management system 100 sends a message indicating the completion of the operation to the host 300.

(Storage Management System 100)

The storage management system 100 includes an acceptance unit 110, a RAID (Redundant Arrays of Independent Disks) management unit (also simply referred to as a management unit) 120, and a disk processing control unit 130.

The acceptance unit 110 accepts requests such as a read request or a write request from the host 300 to the storage system 200.

The RAID management unit 120 manages the correspondence relation between the physical block addresses of respective storage media included in the storage system 200 and the logical block addresses in the storage system 200 viewed from the host 300. When a plurality of storage media included in the storage system 200 constitute RAID, the RAID management unit 120 manages the correspondence relation between the logical block addresses of the storage system 200 viewed from the host 300 and the physical block addresses of the respective storage media constituting the RAID. The RAID management unit 120 also manages the sector size of each of the storage media included in the storage system 200.

The disk processing control unit 130 accesses the respective storage media included in the storage system 200 and performs processes such as a read process for reading from the storage media or a write process for writing on the storage media.

(Storage System 200)

The storage system 200 includes a plurality of storage media. In the example illustrated in FIG. 1, the storage system 200 includes a storage medium 210, a storage medium 211 and an alternative storage medium 220.

The storage system 200 includes at least a storage medium that constitutes RAID and a storage media that does not constitute RAID. The storage medium 210 and the storage medium 211 are the storage media that constitute RAID. The storage medium 210 is a 4-KB-sector storage medium. The storage medium 211 is a 512-B-sector storage medium. The number (i.e., quantity) of storage media that constitute RAID is not limited to that illustrated in FIG. 1. The alternative storage medium 220 illustrated in FIG. 1 is a storage medium that does not constitute RAID. The alternative storage medium 220 may be a spare disk, for example. The alternative storage medium 220 is a 512-B-sector storage medium.

The description will be continued on the assumption that the storage medium 210 and the storage medium 211 constitute RAID 1 (mirroring). The type of RAID is not limited to RAID 1. The RAID management unit 120 can configure any type of RAID such as RAID 0 (striping), RAID 0+1, and RAID 5, for example.

(Host 300)

The host 300 is a 512-B-sector host. The host 300 manages the storage area in the storage system 200 as a logical disk having a sector size of 512 B. The number of hosts is not limited to that illustrated in FIG. 1.

Figure 2:
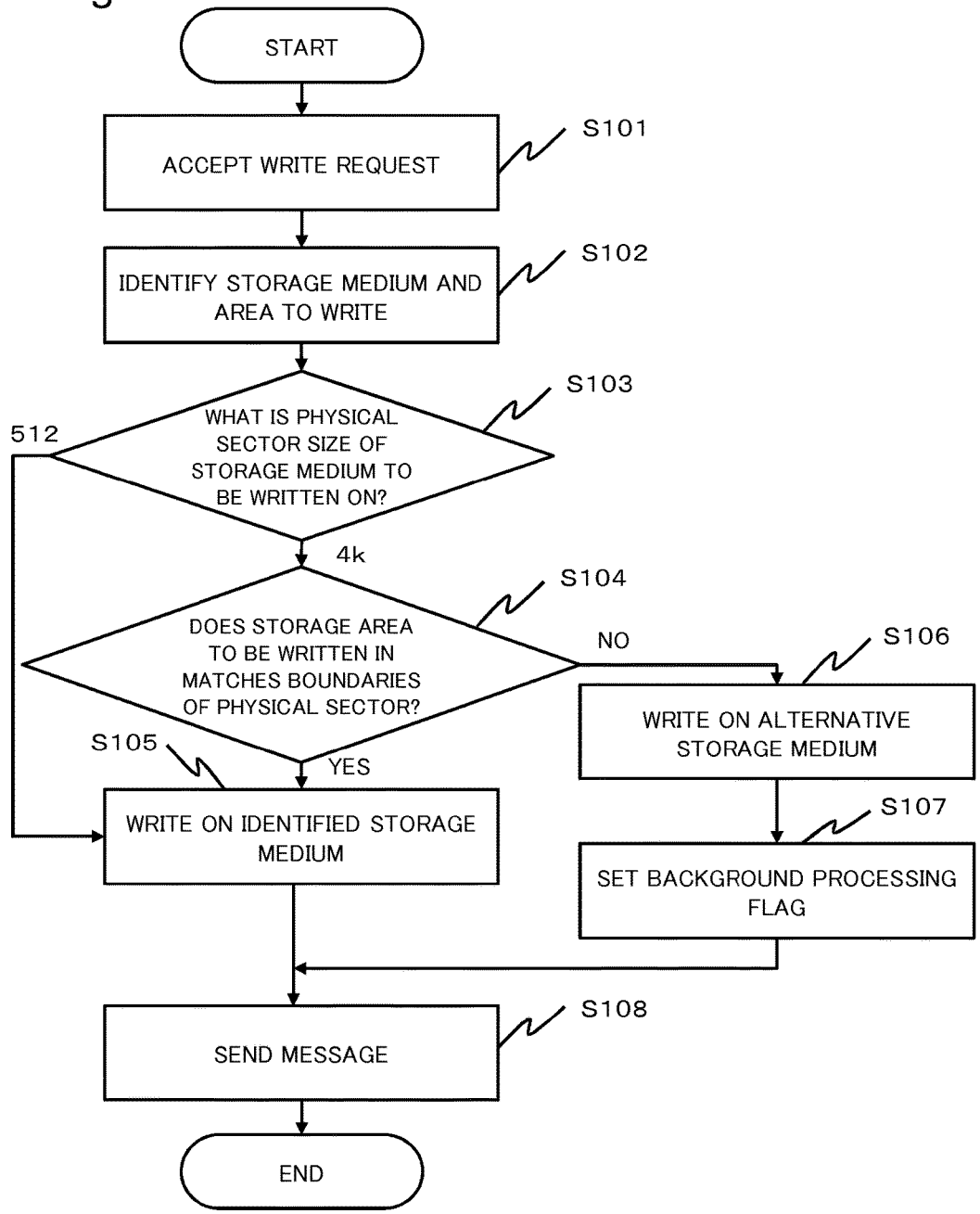
FIG. 2 is a flowchart illustrating an operation of a storage management system when performing a write process according to the first exemplary embodiment.

An operation of the storage management system 100 according to the first exemplary embodiment will now be described. FIG. 2 is a flowchart illustrating an operation of the storage management system 100 when performing a write process.

The acceptance unit 110 accepts a write request from the host 300 (Step S101). The write request contains information specifying a write area. The information specifying the write area may be the start logical block address in the write area and information indicating the data size of data to be written, for example. Since the host 300 is a 512-B-sector host, the write area is specified in 512-byte units.

Based on the information specifying the write area, the RAID management unit 120 identifies the storage medium on which the data is to be written and the physical block address of the storage medium that corresponds to the write area (Step S102).

The RAID management unit 120 may refer to a table storing the correspondence relation between logical block addresses, storage medium identifiers and physical block addresses of the storage media to perform the operation illustrated in Step S102.

As has been described above, the storage system 200 constitutes RAID 1 (mirroring) with the storage medium 210 and the storage medium 211, in the first exemplary embodiment. Accordingly, data requested to be written is written on both of the storage medium 210 and the storage medium 211. A process performed by the disk processing control unit 130 for writing on the storage medium 210 and a process performed by the disk processing control unit 130 for writing on the storage medium 211 will be separately described below.

The RAID management unit 120 determines whether the physical sector size of the storage medium to be written is 4 KB or 512 B (Step S103).

The process performed by the disk processing control unit 130 for writing on the 512-B-sector storage medium 211 will be described first (512 B at Step S103). In this case, the start logical block address and the end logical block in the write area naturally match the boundaries of a physical sector of the 512-B-sector storage medium 211. This is because the write area has been specified in 512-byte units and the storage medium 211 to be written is a 512-B-sector storage medium. In this case, the disk processing control unit 130 does not need to perform Read-Modify-Write. The disk processing control unit 130 performs the process for writing the data to be written on the 512-B-sector storage medium 211 (Step S105).

The process performed by the disk processing control unit 130 for writing on the 4-KB-sector storage medium 210 will be described next (4 KB at Step S103). The RAID management unit 120 determines whether or not the start logical block address or the end logical block address in the write area matches a boundary of the physical sector of the 4-KB-sector storage medium 210 (Step S104).

A process performed when the start logical block address and the end logical block address in the write area match the boundaries of a physical sector of the 4-KB-sector storage medium 210 (YES at Step S104) will be described first. In this case, the disk processing control unit 130 performs a process for writing the data to be written on the 4-KB-sector storage medium 210 (Step S105). Since the disk processing control unit 130 does not need to perform Read-Modify-Write in this case, the performance of the 4-KB-sector storage medium 210 does not degrade.

A process performed when the start logical block address or the end logical block address in the write area does not match a boundary of a physical sector of the 4-KB-sector storage medium 210 (NO at Step S104) will be described next.

In this case, when the disk processing control unit 130 attempts to perform the write process on the 4-KB-sector storage medium 210, the disk processing control unit 130 needs to perform Read-Modify-Write.

Instead of performing the write process on the 4-KB-sector storage medium 210, the disk processing control unit 130 performs the write process on an alternative storage medium 220 (Step S106). Since the alternative storage medium 220 has a physical sector size of 512 B, the disk processing control unit 130 does not need to perform Read-Modify-Write and therefore the performance does not degrade.

At the point of time when the disk processing control unit 130 completes performing the process illustrated in Step S106, the data that is to be written originally on the storage medium 210 is written on the alternative storage medium 220. The disk processing control unit 130 stores a flag indicating that the data written on the alternative storage medium 220 needs to be transferred to the 4-KB-sector storage medium 210. The disk processing control unit 130 stores information indicating where on the alternative storage area the data has been written and information indicating where on the 4-KB-sector storage medium 210 the data is to be written, along with the flag (Step S107).

The disk processing control unit 130 notifies the host 300 of the completion of the requested write process (Step S108).

The host 300 has already received the message indicating the completion of the write process from the storage management system 100 at the point of time when the operation illustrated in Steps S101 to S108 was completed. However, the data that is to be written on the 4-KB-sector storage medium 210 remains to be written on the alternative storage medium 220.

The disk processing control unit 130 performs a process for transferring the data from the alternative storage medium 220 to the 4-KB-sector storage medium 210 in the background (Steps S109 to S111).

Figure 3:
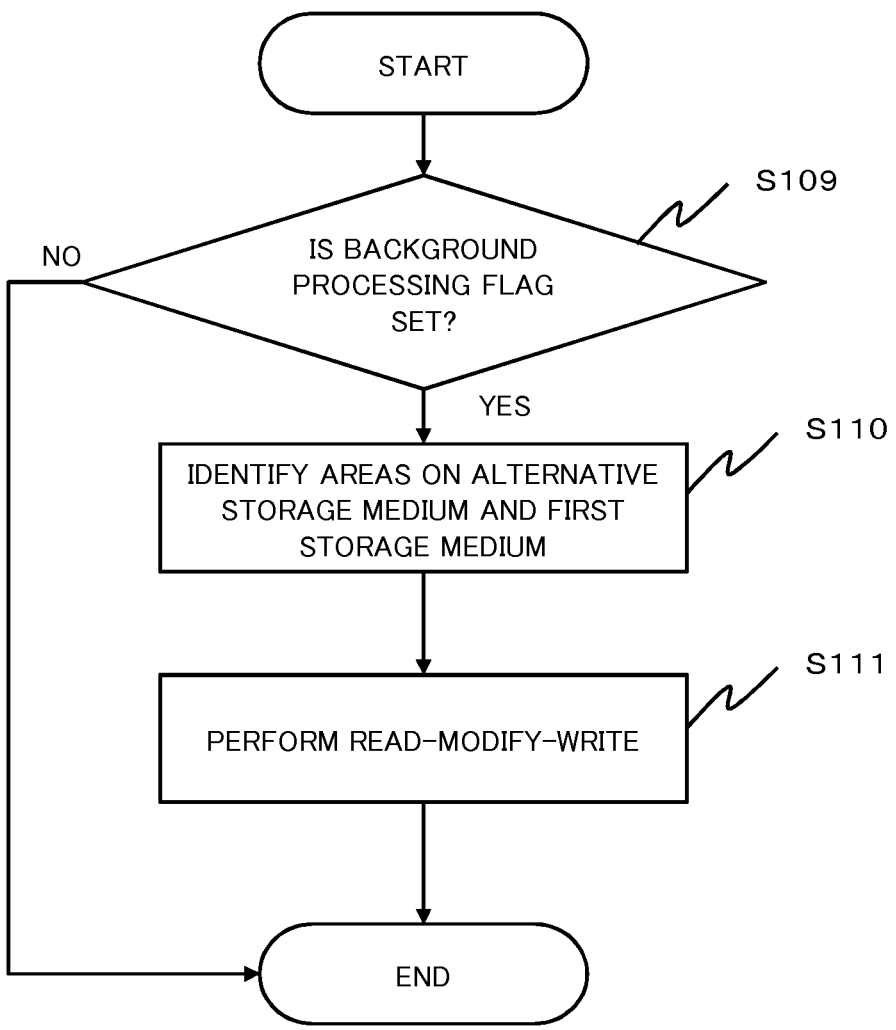
FIG. 3 is a flowchart illustrating an operation of the storage management system when performing a process in a back ground according to the first exemplary embodiment.

FIG. 3 is a flowchart illustrating an operation performed by the storage management system 100 in the background. The disk processing control unit 130 checks to see whether there is a flag set in the operation illustrated in Step S107 (Step S109). When there is no flag, i.e., when there is no operation to be performed in the background (NO at Step S109), the storage management system 100 ends the process.

When there is the flag, i.e., when there is an operation to be performed in the background (YES at Step S109), the disk processing control unit 130 obtains the information stored along with the flag in Step S107. Specifically, the disk processing control unit 130 obtains the information indicating where on the alternative storage medium 220 the data to be transferred is stored and where on the 4-KB-sector storage medium 210 the data is to be written (Step S110).

The disk processing control unit 130 performs Read-Modify-Write to transfer the data to be written from the alternative storage medium 220 to the 4-KB-sector storage medium 210 (Step S111).

Advantageous effects of the storage management system 100 according to the first exemplary embodiment will be described.

The storage management system 100 is capable of suppressing performance degradation when data is written from a 512-B-sector host to a 4-KB-sector storage medium. This is because the storage management system 100 performs Read-Modify-Write, which would degrade the performance, in the background.

When the storage management system 100 accepts a write request of data from the 512-B-sector host and when the data is to be written on a 512-B-sector storage medium, the storage management system 100 directly writes the data because it is not necessary to perform Read-Modify-Write. When the data is to be written on a 4-KB-sector storage medium and when the write area of the data matches the boundaries of a physical sector, the storage management system 100 directly writes the data because it is not necessary to perform Read-Modify-Write; when the write area of the data does not match the boundaries of a physical sector, the storage management system 100 writes the data on an alternative storage medium 220 (a 512 B-sector spare disk) first and sends a message, to the host, that writing has been completed. The storage management system 100 transfers the data from the alternative storage medium 220 to the 4-KB-sector storage medium in the background process. While Read-Modify-Write needs to be performed in this case, performance degradation is invisible to the host because the storage management system 100 performs the process as the background process.

Variation of the First Exemplary Embodiment

Determination illustrated in Step S104 of FIG. 2 may be performed in the background process. Assume that the storage management system 100 has accepted a write request to write on the 4-KB-sector storage medium 210 from the 512-B-sector host 300. In this situation, regardless of whether or not the write area specified by the write request matches the boundaries of a physical sector on the storage medium 210, the storage management system 100 may write the requested data on an alternative storage medium 220. The storage management system 100 may determine whether or not the specified write area matches the boundaries of a physical sector in the background process. If they match, the disk processing control unit 130 transfers the data from the alternative storage medium 220 to the 4-KB-sector storage medium 210 without performing Read-Modify-Write. If they do not match, the disk processing control unit 130 performs Read-Modify-Write and transfers the data from the alternative storage medium 220 to the 4-KB-sector storage medium 210.

The storage management system 100 may perform an operation to determine whether or not there is an available space in a storage capacity on the alternative storage medium 220. When there is no available space in a storage capacity on the alternative storage medium 220, the disk processing control unit 130 may perform a write process on the 4 KB-sector disk even when Read-Modify-Write needs to be performed.

The storage management system 100 may include a cache. When the storage management system 100 performs a write process using write-through method, the storage management system 100 can suppress performance degradation when data is written from a 512-B host to a 4-KB-sector storage.

Second Exemplary Embodiment

In a second exemplary embodiment, a storage management system 101 including a cache will be described. The storage management system 101 according to the second exemplary embodiment performs a write process using write-back method.

Figure 4:
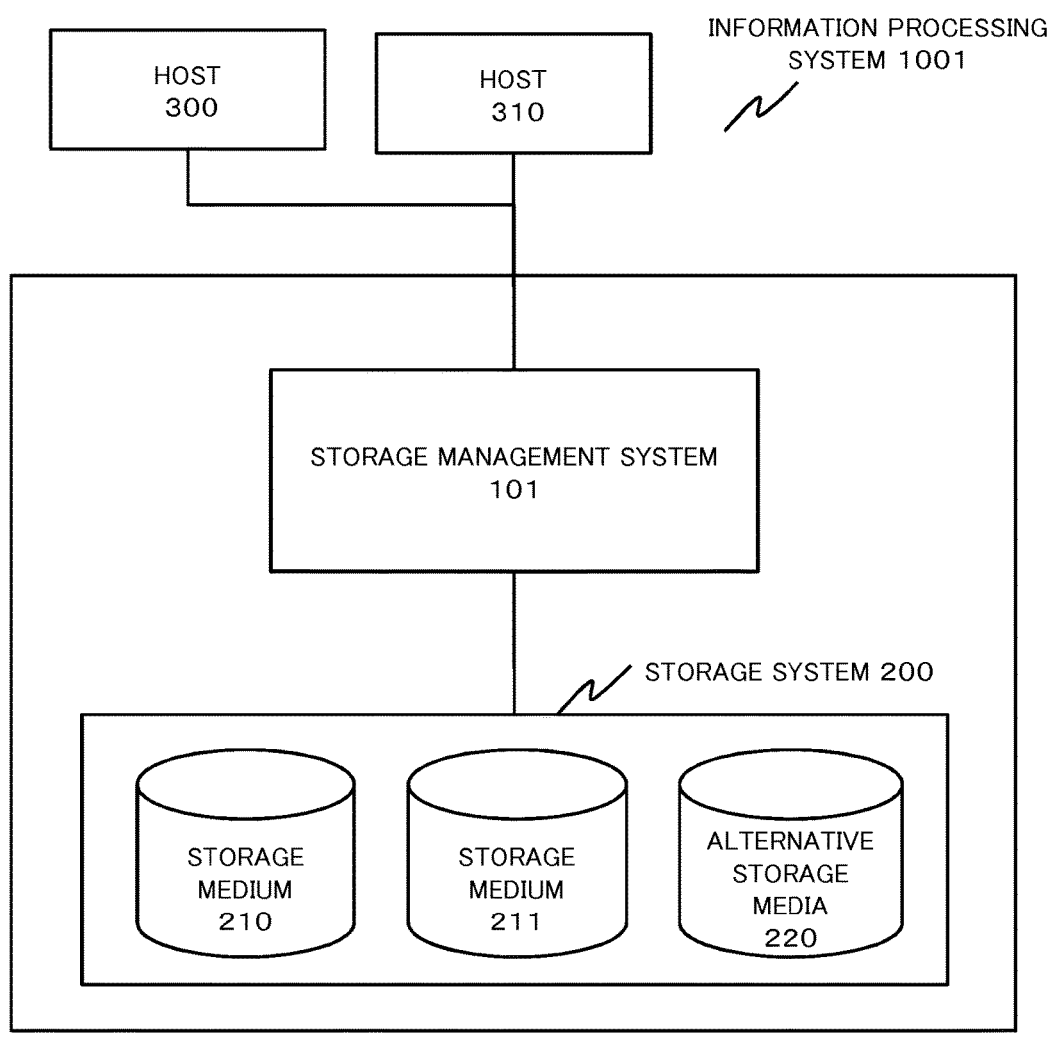
FIG. 4 is a block diagram illustrating the configuration of an information processing system according to a second exemplary embodiment of the present invention.

FIG. 4 is a block diagram illustrating the configuration of an information processing system 1001 according to the second exemplary embodiment. Components that are substantially the same as those illustrated in FIG. 1 are given the same reference numerals and the description of those components will be omitted.

The storage management system 101 according to the second exemplary embodiment accepts a write request or a read request from a host 300 and a host 310. The host 300 is a 512-B-sector host; host 310 is a 4-KB-sector host. The number of hosts that access the storage management system 101 is not limited to that illustrated in FIG. 4.

Figure 5:
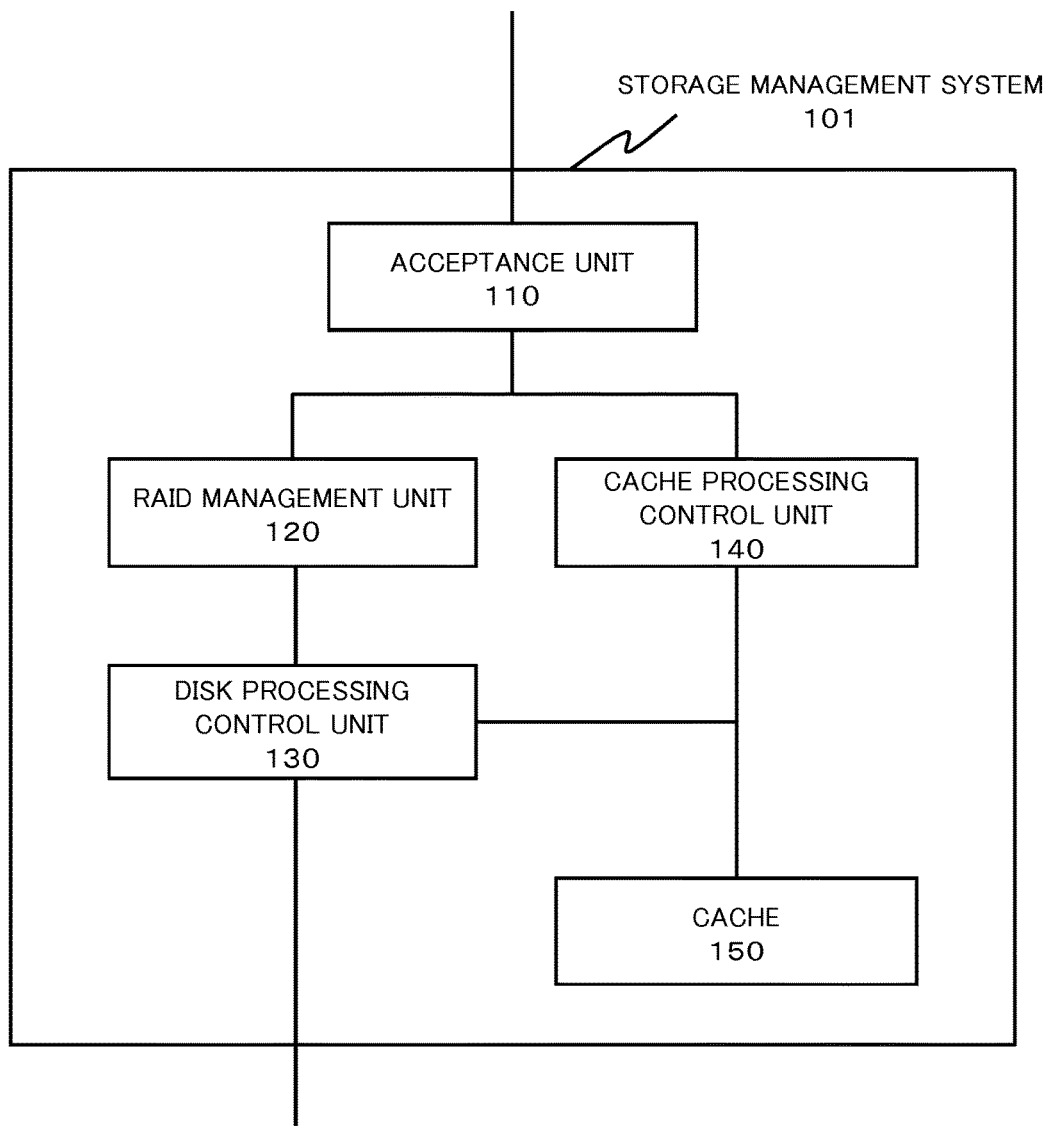
FIG. 5 is a block diagram illustrating the configuration of a storage management system according to the second exemplary embodiment.

FIG. 5 is a block diagram illustrating the configuration of the storage management system 101 depicted in FIG. 4. Components that are substantially the same as those illustrated in FIG. 1 are given the same reference numerals and the description of those components will be omitted. The storage management system 101 according to the second exemplary embodiment includes a cache processing control unit 140 and a cache 150 in addition to the components of the storage management system 100 according to the first exemplary embodiment.

The cache processing control unit 140 allocates an area of the cache 150 to a write process or a read process accepted from a host.

The cache 150 is a storage medium that provides a faster write speed and read speed than the storage system 200. The cache 150 is managed in 512-B sector units. The cache 150 may store 512 bytes of user data and 8 bytes of trailer in one sector and may be managed in 520-B sector units.

Figure 6:
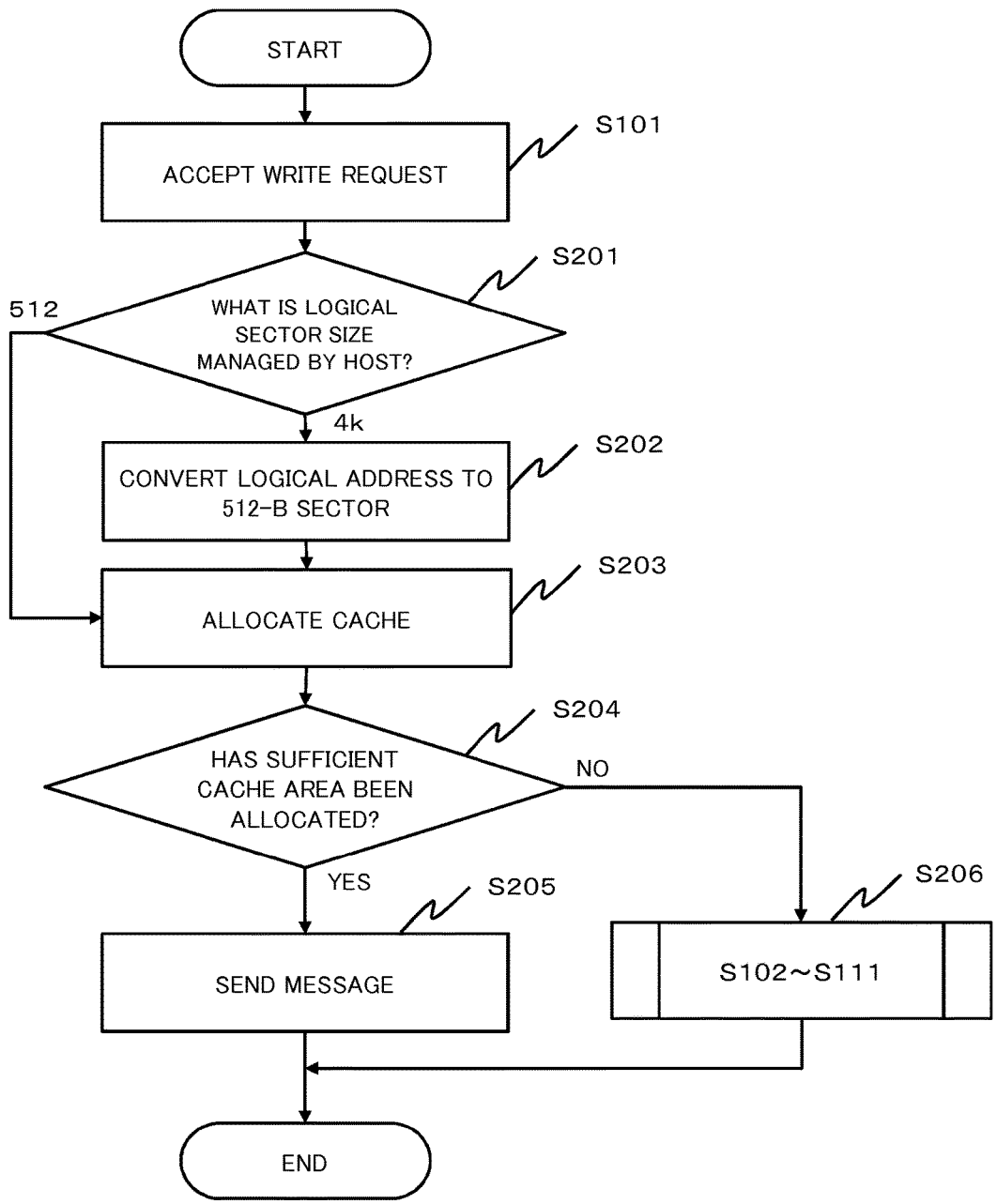
FIG. 6 is a flowchart illustrating an operation of the storage management system when performing a write process according to the second exemplary embodiment.

FIG. 6 is a flowchart illustrating an operation of the storage management system 101 according to the second exemplary embodiment when performing a write process. Steps in which the same operations as those described in FIG. 2 are given the same reference numerals and the description of those steps will be omitted.

When the acceptance unit 110 accepts a write request from a host (Step S101), the cache processing control unit 140 checks the size of logical sectors managed by the host that has sent the write request (Step S201). The cache processing control unit 140 may store, for example, identifiers of the hosts and the sizes of logical sectors managed by the hosts in association with each other beforehand.

A process performed when the sector size managed by the requesting host is 512 B (512 B at Step 201) will be described. The write request that the storage management system 101 has accepted from the host 300 specifies a write area in 512-B units. In the second exemplary embodiment, the cache 150 is managed in 512-B sector units. Accordingly, the cache processing control unit 140 allocates an area of the cache 150 for the write request without sector size conversion (Step S203).

A process performed when the sector size managed by the requesting host is 4 KB (4 KB at Step S201) will be described. The write request that the storage management system 101 has accepted from the host 310 specifies a write area in 4-KB units. However, the cache 150 is managed in 512-B sector units in the second exemplary embodiment. The cache processing control unit 140 therefore converts the write area sector size from 4 KB to 512 B (Step S202).

Based on the converted write area sector size, the cache processing control unit 140 allocates an area of the cache 150 for the write request (Step S203).

The cache processing control unit 140 determines whether or not a sufficient cache area has been secured for processing the write request (Step S204). When the cache processing control unit 140 has secured a sufficient cache area (YES at Step S204), the cache processing control unit 140 processes the write request on the cache. The cache processing control unit 140 sends a message indicating the completion of the write process to the host that has sent the write request (Step S205).

When the cache processing control unit 140 cannot secure a sufficient cache area (NO at Step S204), the RAID management unit 120 and the disk processing control unit 130 perform the operations illustrated in Steps S102 to S111 of FIGS. 2 and 3 for data that overflows the cache (Step S206).

Figure 7:
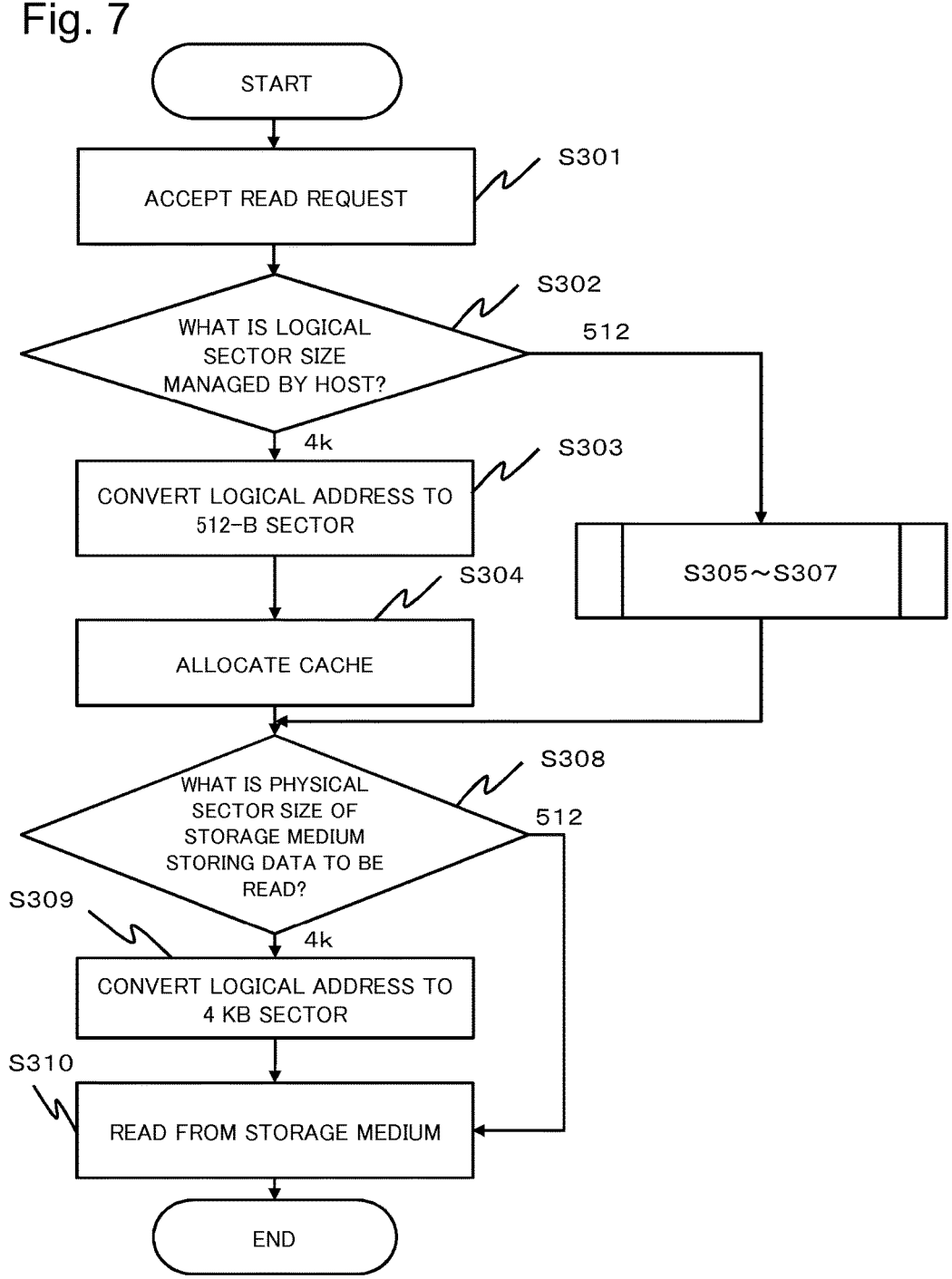
FIG. 7 is a flowchart illustrating an operation of the storage management system when performing a read process according to the second exemplary embodiment.
Figure 8:
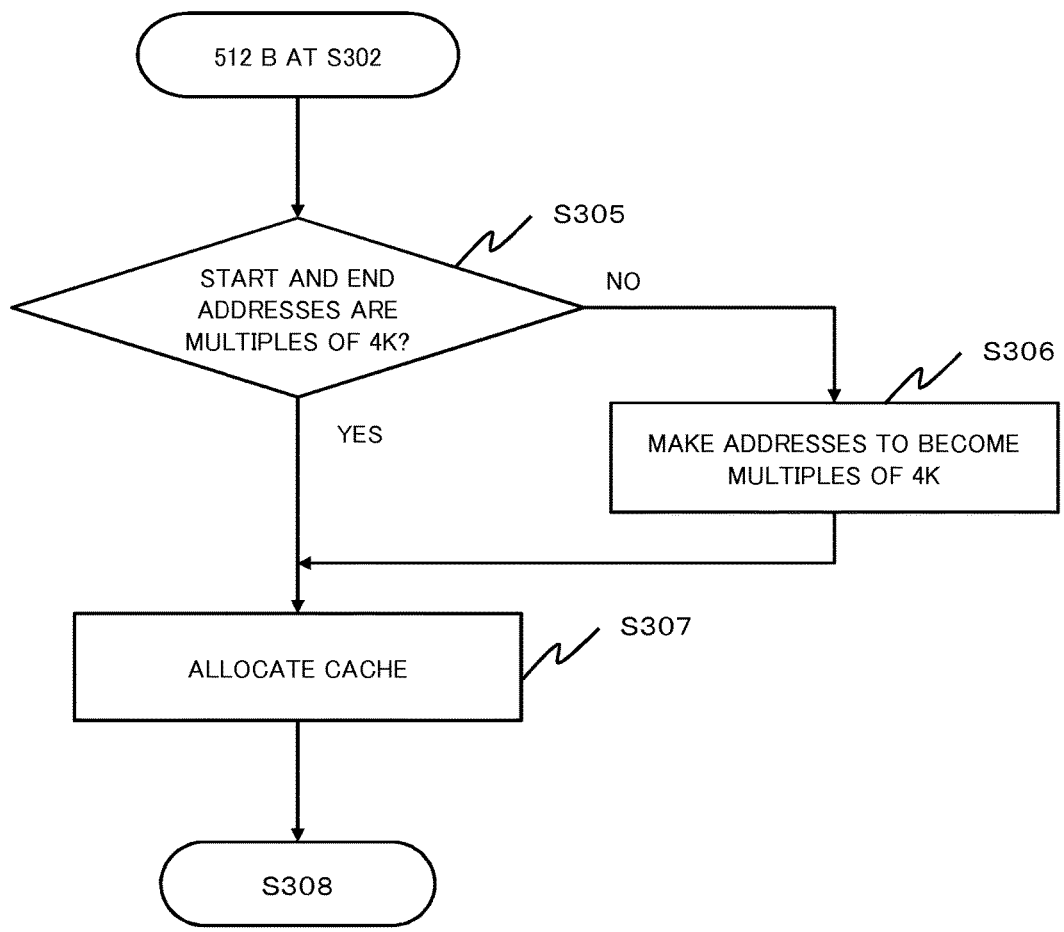
FIG. 8 is a flowchart illustrating an operation of the storage management system when performing a read process according to the second exemplary embodiment.

An operation of the storage management system 101 according to the second exemplary embodiment when performing a read process will be described next. FIGS. 7 and 8 are flowcharts illustrating operations of the storage management system 101 according to the second exemplary embodiment when performing a read process.

The acceptance unit 110 accepts a read request from a host (Step S301). The read request contains information specifying an area from which data is to be read (hereinafter referred to as the "read area"). The information specifying the read area may be the start logical block address in the read area and information indicating the size of the data to be read.

The cache processing control unit 140 checks the size of logical sectors managed by the host that has sent the read request (Step S301). The cache processing control unit 140 may store, for example, identifiers of the hosts and the sizes of logical sectors managed by the hosts in association with each other beforehand.

A process performed when the sector size managed by the requesting host is 4 KB (4 KB at Step S302) will be described. The read request that the storage management system 101 has accepted from the host 300 specifies a read area in 4-KB units. However, the cache 150 is managed in 512-B sector units in the second exemplary embodiment. The cache processing control unit 140 therefore converts the read area sector size from 4 KB to 512 B (Step S303). Based on the converted read area sector size, the cache processing control unit 140 allocates an area of the cache 150 for the read request (Step S304).

A process performed when the sector size managed by the requesting host is 512 B (512 B at Step 302) will be described. The read request that the storage management system 101 has accepted from the host 300 specifies a read area in 512-B units. The cache processing control unit 140 checks to see whether the start logic block address and the end logic block address in the read area are multiples of 4 KB (Step S305). If the logic block addresses are multiples of 4 KB (YES at Step S305), the cache processing control unit 140 allocates cache for processing the read request. If the logical block addresses are not multiples of 4 KB (NO at Step S305), the cache processing control unit 140 extends the read area so that the start logical block address and the end logical block address in the read area become multiples of 4 KB (Step S306). The cache processing control unit 140 allocates cache for the extended read process (Step S307).

When a sufficient cache area cannot be secured for processing the read request, the cache processing control unit 140 may perform processing such as cache flushing and may perform the read process after a sufficient cache area is secured.

The RAID management unit 120 identifies the storage medium storing the data and a physical block address on the storage medium, based on the logic block address and the size of the data included in a read request. In this operation, the RAID management unit 120 checks the sector size of the storage medium that stores the data (Step S308).

When the storage medium to be read is a 512-B-sector storage medium, the disk processing control unit 130 reads the data to be read from the 512-B-sector storage medium 211 to the cache 150 (Step S310). When the storage medium to be read is a 4-KB-sector storage medium, the disk processing control unit 130 extends the read area identified by the read request to 4 KB (Step S309). The disk processing control unit 130 reads the data from the 4-KB-sector storage medium 210 to the cache 150 based on the extended read request (Step S310).

Advantageous effects of the storage management system 101 according to the second exemplary embodiment will be described.

Even with a cache 150 and write-back method, the storage management system 101 is capable of suppressing performance degradation when writing on a 4-KB-sector storage medium from a 512-B-sector host. This is because the storage management system 101 performs an operation similar to that of the storage management system 100 according to the first exemplary embodiment for a write process for which cache cannot be allocated.

Furthermore, the storage management system 101 is capable of performing a write process and a read process in an environment where a 512-B-sector storage medium, a 4-KB-sector storage medium, a 512-B-sector host and a 4-KB-sector host are mixedly used.

Variation of the Second Exemplary Embodiment

Assume that a 4-KB-sector storage medium 210 and a 512-B-sector storage medium 211 constitute RAID 1 (mirroring), and data to be read is stored on both of the 4-KB-sector storage medium 210 and the 512-B-sector storage medium 211, for example, in the processing illustrated in Step S308 of FIG. 7. In this case, the disk processing control unit 130 does not need to perform processing such as sector conversion and may select and read one of the storage media that can be read more quickly.

The disk processing control unit 130 may select and read an appropriate one of storage media based on, for example, whether data to be read is sequential data or not.

Physical sector sizes of storage media are not limited to 512 B and 4 KB. The present exemplary embodiment can be implemented with at least two storage media that have different physical sector sizes.

For example, the present exemplary embodiment can be implemented with storage media that have a physical sector size other than 512 B or 4 KB if they contain such data as trailers. For example, sector sizes such as 520 B, 528 B, 4104 B, 4160 B and 4224 B are commonly used.

Furthermore, the present exemplary embodiment can also be implemented with storage media having a physical sector size of 1024 B or 2048 B.

Third Exemplary Embodiment

Figure 9:
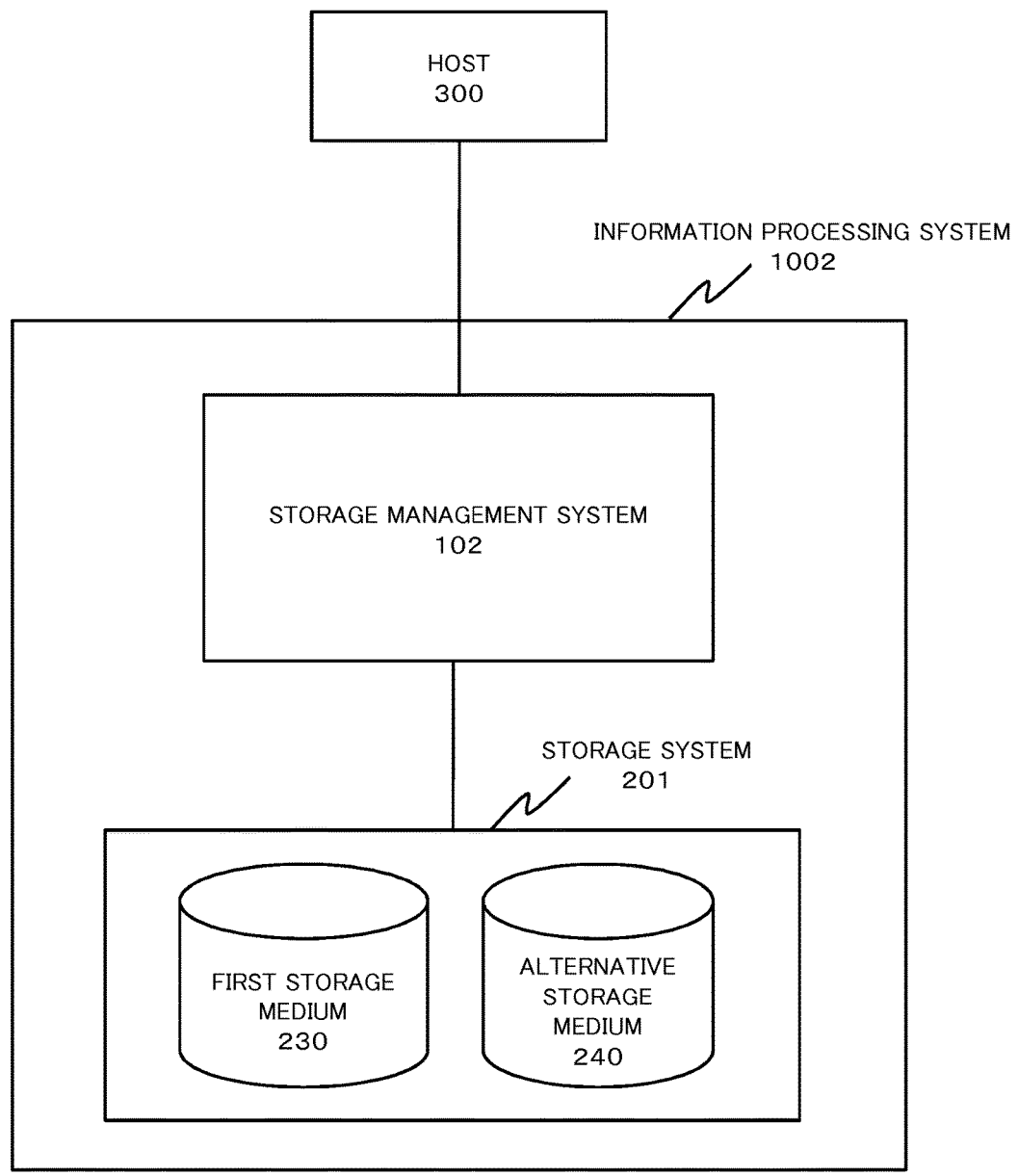
FIG. 9 is a block diagram illustrating the configuration of an information processing system according to a third exemplary embodiment of the present invention.

FIG. 9 is a block diagram illustrating the configuration of an information processing system 1002 according to a third exemplary embodiment. The information processing system 1002 according to the third exemplary embodiment is communicably connected to a host 300. The information processing system 1002 includes a storage management system 102 and a storage system 201.

The storage system 201 includes a first storage medium 230 and an alternative storage medium 240. The first storage medium 230 has physical sectors of a first size. The alternative storage medium 240 has physical sectors of a second size. The second size is smaller than the first size.

The host 300 requests the storage management system 102 to perform a write process. The host 300 manages logical sectors of the second size.

The storage management system 102 accepts a write request from the host 300, accesses the storage system 201, and performs a write process.

The storage management system 102 accepts the write request that requests to write in units of the second size from the host 300. The storage management system 102 writes data identified by the write request on the alternative storage medium 240 when both of the following first and second conditions are satisfied. The first condition is that the write area identified by the write request is an area on the first storage medium 230. The second condition is that the start address or the end address in the write area does not correspond to a boundary of a physical sector of the first storage medium 230. The storage management system 102 notifies the host 300 of completion of the writing. After the notification, the storage management system 102 transfers the data from the alternative storage medium 240 to the first storage medium 230.

<Example of Hardware Configuration of Storage Management System>

Figure 10:
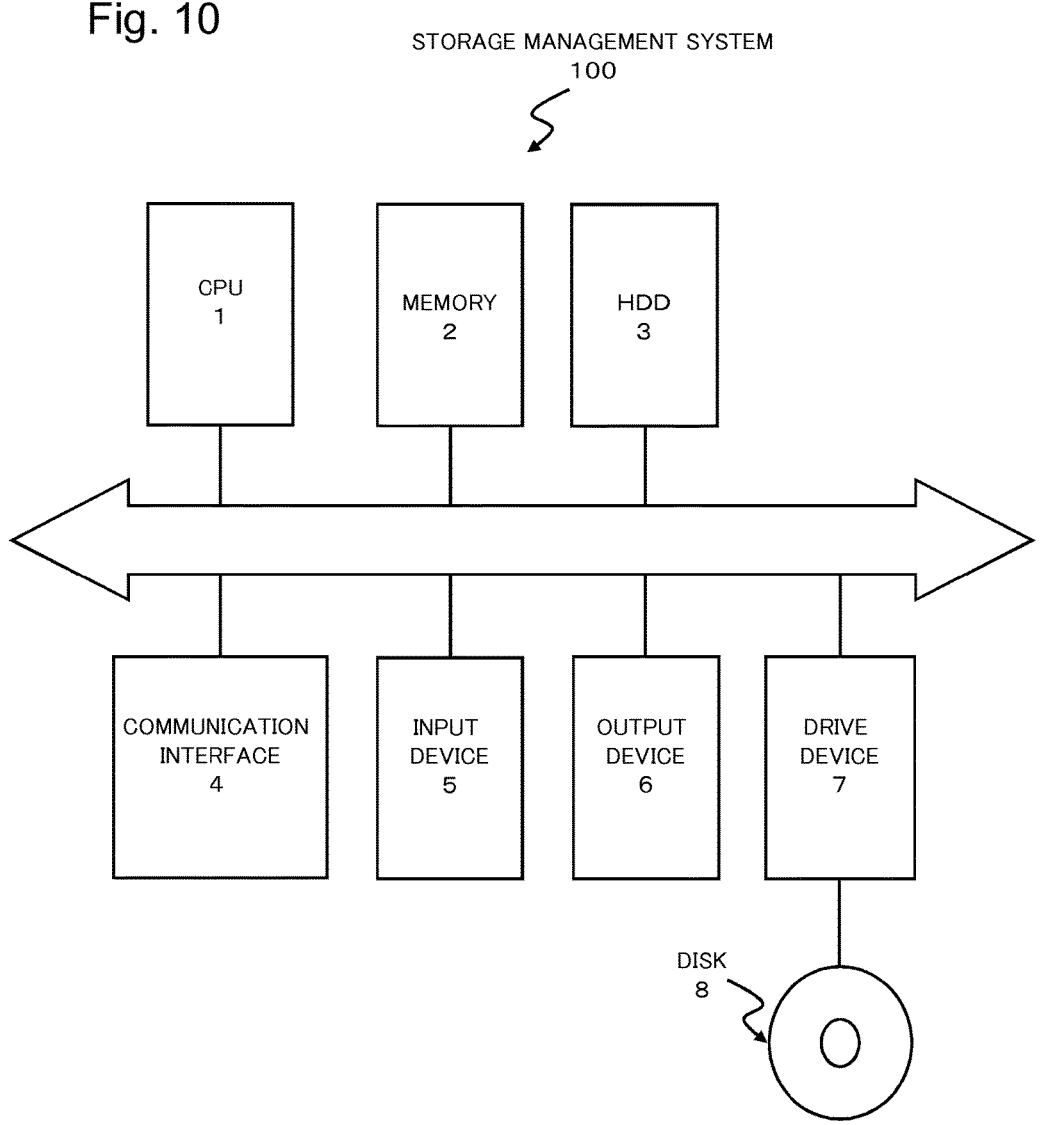
FIG. 10 is a diagram illustrating an example of the hardware configuration that can implement a storage management system according to respective exemplary embodiments of the present invention.

FIG. 10 is a diagram illustrating an example of the hardware configuration that can implement the storage management system according to respective exemplary embodiments described above.

Hardware constituting the storage management system (a computer) includes a CPU (Central Processing Unit) 1, a memory 2, an HDD 3, and a communication interface (I/F) 4. The storage management system may include an input device 5 and an output device 6. The functions of the storage management system are implemented by the CPU 1 executing a computer program (a software program, hereinafter simply referred to as the "program") loaded on the memory 2, for example. During the execution of the program, the CPU 1 controls the communication interface 4, the input device 5, and the output device 6 as appropriate.

Note that the present invention described by taking the present exemplary embodiments and the respective exemplary embodiments that will be described below as examples is also configured by a non-transitory (nonvolatile) disk (also referred to as a storage medium) 8 such as a compact disc on which the program is stored. The program stored on the disk 8 is read by a drive device 7, for example.

Communications performed by the storage management system 100 is implemented by an application program controlling the communication interface 4 by using functions provided by an OS (Operating System), for example. The input device 5 may be a keyboard, a mouse, or a touch panel, for example. The output device 6 may be a display, for example. The storage management system may be configured by wired or wireless connection between two or more physically separate devices.

The example of the hardware configuration illustrated in FIG. 10 is also applicable to each of the exemplary embodiments described above. Note that the storage management system may be a dedicated device. The hardware configurations of the storage management system and each of function blocks thereof are not limited to the configurations described above.

Figure 12:
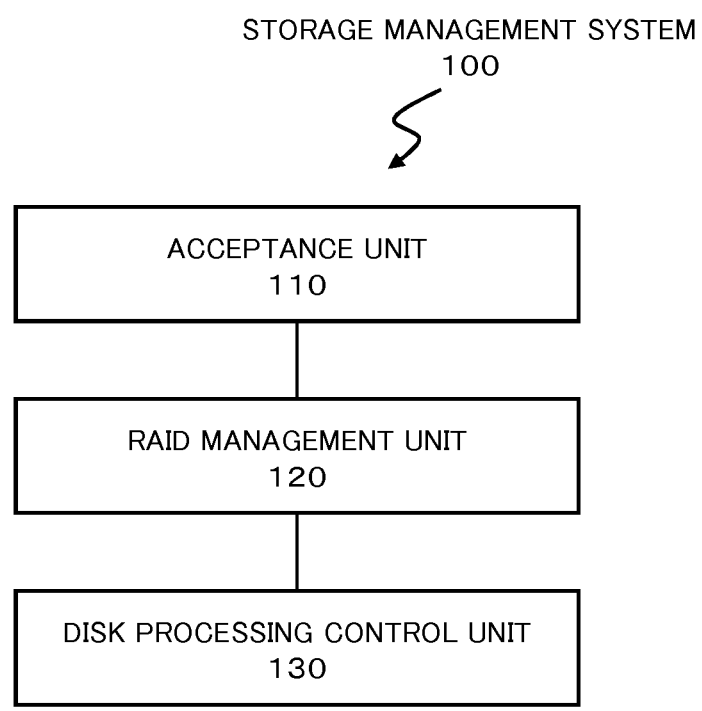
FIG. 12 is a block diagram illustrating a minimum configuration of a storage management system of the present invention.

FIG. 12 is a block diagram illustrating a minimum configuration of a storage management system 100. The storage management system 100 illustrated in FIG. 12 is implemented by the storage management system 100 illustrated in FIG. 10 as described above.

The variations described above are also applicable to other exemplary embodiments.

The exemplary embodiments described above can be implemented in combination as appropriate. The present invention is not limited to the exemplary embodiments described above and can be implemented in various modes.

The components represented by blocks in the block diagrams are merely the configurations for convenience of explanation. The present invention described by taking the exemplary embodiments as examples is not limited to the configurations illustrated in the block diagrams for implementation.

Using a 512-B-sector host and 4-KB-sector storage media together as disclosed in Patent Literature 1 can degrade the performance when writing is made on the storage media from the host.

This is because Read-Modify-Write is required when writing is made on a 4-KB-sector storage medium from a 512-B-sector host.

One example of advantageous effects of the present invention is that degradation of performance can be suppressed when a host writes data on a storage medium having a physical sector size different from a logical sector size managed by the host.

While exemplary embodiments of the present invention have been described, the exemplary embodiments described above are given for facilitating the understanding of the present invention and are not intended to be construed as limiting the present invention. Modifications and improvements can be made to the present invention without departing from the spirit of the invention and equivalents of the present invention are also included in the present invention.

INDUSTRIAL APPLICABILITY

The present invention is applicable to disk array devices and the like, for example.

DESCRIPTION OF SYMBOLS

1 . . . CPU
2 . . . Memory
3 . . . HDD
4 . . . Communication interface
5 . . . Input device
6 . . . Output device
7 . . . Drive device
8 . . . Storage medium
20 . . . Storage medium
30 . . . Host
100 . . . Storage management system
101 . . . Storage management system
102 . . . Storage management system
110 . . . Acceptance unit
120 . . . RAID management unit
130 . . . Disk processing control unit
140 . . . Cache processing control unit
150 . . . Cache 200 . . . Storage system
201 . . . Storage system
210 . . . Storage medium
211 . . . Storage medium
220 . . . Alternative storage medium
230 . . . First storage medium
240 . . . Alternative storage medium
300 . . . Host
310 . . . Host
1000 . . . Information processing system
1001 . . . Information processing system
1002 . . . Information processing system

The invention claimed is:

1. A storage management system, comprising:
a CPU; and
a memory in connection with the CPU, the memory having stored therein programming code that causes the CPU, upon execution of the programming code, to function as:
   a management unit that manages a RAID-1 storage system, where the RAID-1 storage system includes a first storage medium with physical sectors of a first size, a second storage medium with physical sectors of a second size smaller than the first size, the first and second storage media operated in accordance with RAID-1,
   the management unit also managing an alternative storage medium with physical sectors of the second size and that is not operated by RAID-1;
   an acceptance unit that receives a write request from a host in communication with the RAID-1 storage system, the write request carrying a request to have the RAID-1 storage system carry out a writing operation in units of the second size; and
   a disk processing control unit that
      writes data identified by the write request on the second storage medium,
      writes, before reading data from the first storage medium, the data identified by the write request on the alternative storage medium, on condition that
         i) a write area identified by the write request is an area on the first storage medium, and
         ii) a start address or an end address in the write area does not correspond to boundaries of a physical sector of the first storage medium,
      notifies the host of completion of the writing, and
      transfers the data from the alternative storage medium to the first storage medium after the notification,
   wherein the disk processing control unit prioritizes the notification of the host in favor of the transfer of the data from the alternative storage medium to the first storage medium, such that the disk processing control unit carries out the notification of the host of completion of the writing regardless of whether the data has transferred from the alternative storage medium to the first storage medium,
   wherein the disk processing control unit is connected to the RAID-1 storage system by using one control connection path, and
   wherein the management unit selects and reads data from one selected from the first storage medium and the second storage medium, based on whether the data stored thereon to be read is sequential data or not.

2. The storage management system according to claim 1, wherein the disk processing control unit writes data identified by the write request on the first storage medium and notifies the host of completion of the writing, when a write area identified by the write request is an area on the first storage medium and the start address and the end address of the write area correspond to boundaries of a physical sector of the first storage medium.

3. The storage management system according to claim 1, wherein
   the disk processing control unit stores information identifying an area in which the data is written on the alternative storage medium and an information identifying an area in which the data is to be written on the first storage medium when the data is written on the alternative storage medium, and
   transfers the data from the alternative storage medium to the first storage medium based on the stored information after the notification.

4. The storage management system according to claim 1, wherein
   the write request includes information identifying an area in which data is to be written according to a logical block address in the storage system and the data size of the data to be written,
   the management unit refers to a table storing logical block addresses in the storage system, storage media included in the storage system, and physical block addresses on the storage media in association with each other based on a logical block address included in the accepted write request, to identify a storage medium on which the data is to be written and a physical block address on the storage medium, and
   the disk processing control unit writes data identified by the write request on the alternative storage medium, when an area identified by the write request is the area on the first storage medium and the start logical block address or the end logical block address of the area does not correspond to one of the boundaries of a physical sector of the first storage medium.

5. The storage management system according to claim 1, wherein
   when a write area identified by the write request includes both of an area on the first storage medium and an area on the second storage medium, the disk processing control unit
   writes, on the alternative storage medium, data to be written on the first storage medium from among data identified by the write request, when the start address or the end address of the area on the first storage medium from among the write areas identified by the write request does not correspond to one of boundaries of a physical sector of the first storage medium,
   writes, on the first storage medium, data to be written on the second storage medium from among the data identified by the write request,
   notifies the host of completion of the writing, and
   transfers the data written on the alternative storage medium from the alternative storage medium to the first storage medium after the notification.

6. The storage management system according to claim 1, wherein the first size is 4096 bytes or 4160 bytes, and the second size is 512 bytes or 520 bytes.

7. The storage management system according to claim 1, wherein the first storage medium is a disk-based storage medium.

8. The storage management method according to claim 1, wherein during a read operation, the disk processing control unit reads data from one of the first storage medium or the second storage medium based on a selection that considers whether sector conversion is required to read from the one of the first storage medium or the second storage medium.

9. An information processing system, comprising:
a first storage medium having physical sectors of a first size;
a second storage medium having physical sectors of a second size smaller than the first size;
an alternative storage medium with physical sectors of the second size; and
a storage management system, including a CPU and a memory having stored therein programming code that, upon execution by the CPU, causes the storage management system to operate as
a management unit that manages a RAID-1 storage system operationally including the first storage medium and the second storage medium, and also manages the alternative storage medium where said alternative storage medium is not operated as RAID-1,
an acceptance unit that accepts a write request from a host capable of accessing the RAID-1 storage system, the write request requesting the RAID-1 storage system to make writing in units of the second size, and
a disk processing control unit that
writes data identified by the write request on the second storage medium,
writes, before reading data from the first storage medium, the data identified by the write request on the alternative storage medium, on condition that
i) a write area identified by the write request is an area on the first storage medium, and
ii) a start address or an end address in the write area does not correspond to boundaries of a physical sector of the first storage medium,
notifies the host of completion of the writing, and
transfers the data from the alternative storage medium to the first storage medium after the notification,
wherein the disk processing control unit prioritizes the notification of the host in favor of the transfer of the data from the alternative storage medium to the first storage medium, such that the disk processing control unit carries out the notification of the host regardless of whether the data has transferred from the alternative storage medium to the first storage medium,
wherein the disk processing control unit is connected to the RAID-1 storage system by using one connection path, and
wherein the management unit selects and reads data from one selected from the first storage medium and the second storage medium, based on whether the data stored thereon to be read is sequential data or not.

10. The information processing system according to claim 9, wherein the first storage medium is a disk-based storage medium.

11. The information processing system according to claim 9, wherein during a read operation, the disk processing control unit reads data from one of the first storage medium or the second storage medium based on a selection that considers whether sector conversion is required to read from the one of the first storage medium or the second storage medium.

12. A storage management method implemented by a computer capable of accessing a storage system including a first storage medium including physical sectors of a first size, a second storage medium including physical sectors of a second size smaller than the first size, an alternative storage medium with physical sectors of the second size, and a host capable of accessing the storage system,
wherein the computer:
accepts a write request from the host, the write request requesting the storage system to make writing in units of the second size;
writes data identified by the write request on the second storage medium,
writes, before reading data from the first storage medium, the data identified by the write request on the alternative storage medium, on condition that
i) a write area identified by the write request is an area on the first storage medium, and
ii) a start address or an end address in the write area does not correspond to boundaries of a physical sector of the first storage medium;
notifies the host of completion of the writing; and
transfers the data from the alternative storage medium to the first storage medium after the notification,
wherein the computer prioritizes the notification of the host in favor of the transfer of the data from the alternative storage medium to the first storage medium, such that the computer carries out the notification of the host regardless of whether the data has transferred from the alternative storage medium to the first storage medium,
wherein the computer connects to the RAID-1 storage system by using one connection path, and
wherein the management unit selects and reads data from one selected from the first storage medium and the second storage medium, based on whether the data stored thereon to be read is sequential data or not.

13. The storage management method according to claim 12, wherein the first storage medium is provided as a disk-based storage medium.

14. The storage management method according to claim 12, wherein during a read operation, data is read from one of the first storage medium or the second storage medium based on a selection that considers whether sector conversion is required to read from the one of the first storage medium or the second storage medium.

15. A program, recorded on a non-transitory recording medium, that upon execution by a computer, which is in communication with a host and a RAID-1 storage system that includes a first storage medium including physical sectors of a first size and a second storage medium including physical sectors of a second size smaller than the first size, and is also in communication with an alternative storage medium with physical sectors of the second size and that is not operated by RAID-1, causes the computer to perform the steps of:
accepting a write request from the host, the write request requesting the RAID-1 storage system to make writing in units of the second size;
writing data identified by the write request on the second storage medium;
writing, before reading data from the first storage medium, the data identified by the write request on the alternative storage medium on condition that
i) a write area identified by the write request is an area on the first storage medium, and
ii) a start address or an end address in the write area does not correspond to boundaries of a physical sector of the first storage medium;
notifying the host of completion of the writing; and
transferring the data from the alternative storage medium to the first storage medium after the notification,
wherein, in the notifying step, the notification of the host is carried out regardless of whether the data has transferred from the alternative storage medium to the first storage medium, and wherein the computer is connected to the RAID-1 storage system by using one control connection path, and wherein the method further comprises a step of:

reading data from one selected from the first storage medium and the second storage medium, based on whether the data stored thereon to be read is sequential data or not.

16. The program according to claim 15, wherein during a read operation, data is read from one of the first storage medium or the second storage medium based on a selection that considers whether sector conversion is required to read from the one of the first storage medium or the second storage medium.

* * * * *